May 16, 1933.　　　J. MEHREN　　　1,908,777

CHUCK

Filed Dec. 4, 1930

Inventor:
J. Mehren

By: Marks & Clerk
Attys

Patented May 16, 1933

1,908,777

UNITED STATES PATENT OFFICE

JOSEF MEHREN, OF DUSSELDORF, GERMANY, ASSIGNOR TO FIRM VEREINIGTE STAHLWERKE AKTIENGESELLSCHAFT, OF DUSSELDORF, GERMANY

CHUCK

Application filed December 4, 1930, Serial No. 500,057, and in Germany December 12, 1929.

The invention relates to a chuck having joint simultaneous radial movement of all the jaws. The invention presents important advantages in comparison with known devices of the kind.

There are numerous known types of chuck having joint radial movement of the jaws, most of which have for example conical guides along which the jaws or levers of the chuck move. In other constructions the radial movement of the jaws is produced by the relative movement of two central rings, on which the chuck member is mounted. It has also been proposed to produce a radial movement of the jaws to clamp the work by means of a toothed segment and rack secured to the jaw.

The defect of such apparatus is on the one hand that the radius of action of the chuck is extremely small, or cannot be varied except by troublesome manipulations which entail loss of time; that is to say the machine cannot be re-set for work of considerably larger or smaller diameter except with considerable waste of time, if at all. Furthermore, the great disadvantage of known apparatus is the difficulty of obtaining fine adjustment of the jaws.

The present invention is fundamentally different in that the radius of action of the chuck can be modified within a wide range, and that the adjustment for taking work of a different diameter can be effected very quickly, and with the greatest accuracy by means of fine adjustment.

The apparatus according to the invention has the advantages hereinbefore mentioned.

According to the invention a worm and worm-wheel segment is employed for producing the radial movement of the jaws, which are mounted on the worm. By these means the radius of action can be changed by the simple turning of the worm, and the entire working programme of a machine can be carried through with a single chuck, and without changing any of the parts, by merely selecting a worm of suitable length. The fine adjustment of the jaws can be obtained by adjusting only a single worm, or a portion of the worms, instead of all of them simultaneously. This ensures that the work is perfectly centered at all times.

It is known to accelerate the fixing of the work by using pneumatic cylinders, which either rotate the toothed segment through levers or else, in the case of other types of chuck, actuate conical bushes or guides. Such mechanism is also provided according to the present invention, the worm-wheel segment being set in motion by a lever and by the advance of a piston pneumatically operated. Considering the elasticity of the gripping force the work can be adjusted under gripping pressure by means of worm and worm-wheel segment. This operation is effected by one of the worms being eased, the other worms, or jaws, following up automatically and thus bringing the work into another position.

In some operations, less importance attaches to accurate centering of the work than to rapidly varying the radius of action of the chuck, in which case the possibility of secondary adjustment might be dispensed with. For such a case the invention provides for a simultaneous joint adjustment of all the worms. For example, the apparatus may be constructed with a small cone pinion mounted on the extension of each worm shaft, all these pinions being in engagement with a large cone ring.

If great importance is attached both to very rapid and joint central adjustment of all the worms, and to the possibility of a secondary adjustment of the work, this problem is solved according to the invention by providing a screw between the worm and the jaw, thus enabling each jaw to be adjusted separately. It will be understood that this additional separate adjustment of each jaw can be effected by means of any other machine element, such as a pneumatically operated piston or the like.

The invention is illustrated by way of example in the accompanying drawing—

Figure 1:
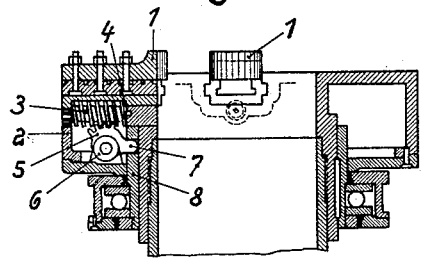
Figure 1 is a section through a chuck as employed for a hollow spindle.

The jaws 1 are coupled to worms 3, which are mounted in the chuck 2 and engage in a recess 4 in the jaw 1. The worms 3 also gear with worm-wheel segments 5, which form one end of two-armed levers 6, while the other arms 7 engage in recesses in a ring 8 (Figure 1) or a bush 9 (Figure 2) disposed centrally in relation to the axis of the spindle. By axial displacement of the ring 8 or the bush 9—which may be effected by pneumatic hydraulic or other means—the levers 6 are rotated on their pivots, thus displacing the worms 3 longitudinally without rotation. The jaws 1 are carried by the worms and by this means are all simultaneously displaced radially.

In this construction the radial adjustment of any one jaw is effected in a simple manner, in that the worm belonging to the jaw is rotated, for example, by means of a tommy pin inserted in a corresponding gap in the worm. In this manner, as the worm-wheel segment remains in position, the worm is simultaneously advanced longitudinally, and thus moves the jaw with it.

Figure 3:
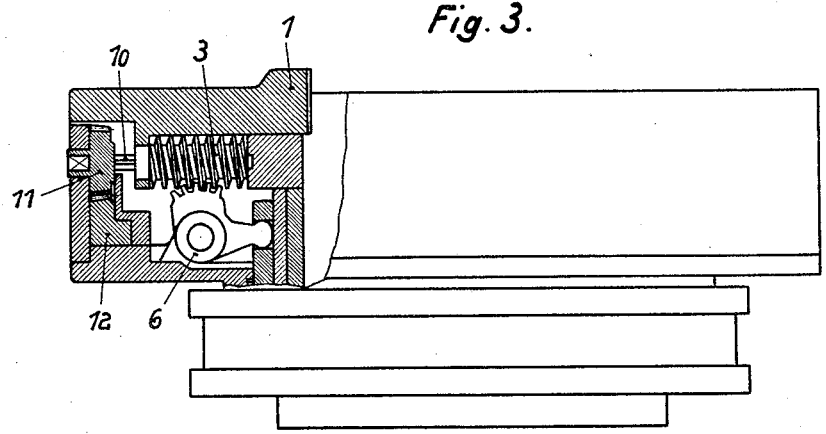
Figure 3 is a part sectional side elevation of an apparatus according to the invention.

Figure 3 shows the chuck with a joint adjustment for all the jaws by means of a cone ring 12 and cone pinion 11. The cone pinion 11 carries a driving shaft 10 with which the worm 3 is telescopically connected so that on rotation of the cone pinion it rotates with the latter, and it is adapted to slide axially thereto. The telescopic connection is effected in the present case by a sliding wedge or key, and it may also be effected by a squared driving shaft engageable in a similar shaped bore of the worm. The cone pinions belonging to all of the clamping jaws are interconnected by means of the intermediate ring 12. This intermediate ring transmits motion from the cone 11 to all of the other cone pinions or worm shafts, so that owing to the worm wheel segments being at rest, all the worms are longitudinally displaced for the same distance and correspondingly move the jaws.

Figure 2:
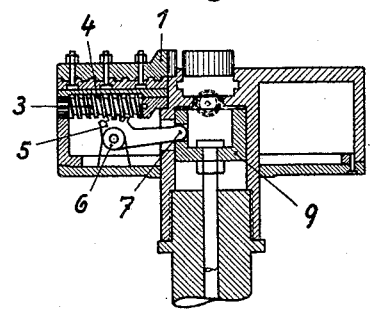
Figure 2 shows a chuck of the normal type.

The swinging movement of the two armed lever 6 is introduced by the entraining of the lever end 7 during the longitudinal movement of the ring 8, in Figure 1, or the head 9, in Figure 2.

Figure 4:
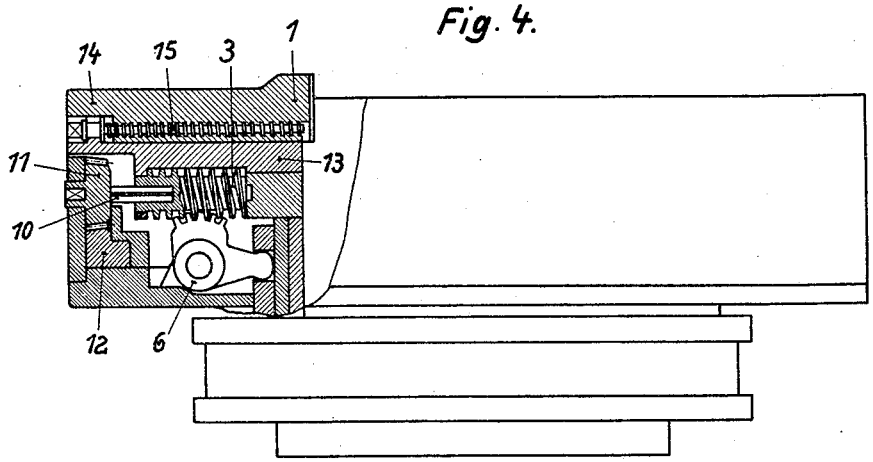
Figure 4 is a part sectional side elevation showing a modification.

Figure 4 shows a modification of the last-mentioned chuck in which, in addition to the joint adjustment of all the jaws, a separate fine adjustment is provided for each jaw by means of a screw-threaded spindle. A member 14, carrying the actual gripping face of the jaw, is movably mounted on a member 13 of the jaw, which is coupled to and displaceable with the worm 3, and this member 14 can be independently moved by a screw-threaded spindle 15 rotatably mounted in the member 13.

I claim:

1. A chuck comprising a head, jaws radially disposed in the head with at least one of the jaws radially movable therein, a worm journaled in the movable jaw and held therein against axial movement, an angular lever pivoted to the head and having a segmental gear at the extremity of one of its arms meshing with the worm, operating means engaging the extremity of the other arm of the lever to actuate said lever to move the worm axially to adjust the movable jaw radially in the head, the thread of the worm constituting a rack engaging the segmental gear during said radial adjustment of the movable jaw, said operating means also acting to hold the angular lever stationary at the position to which it is moved in the adjustment of the movable jaw, and means for rotating the worm against the resistance of the segmental gear held by the stationary angular lever to impart a supplemental radial adjustment to the movable jaw.

2. A chuck as claimed in claim 1 wherein the means for rotating the worm comprises a pinion fixed on a shaft journaled in the chuck head and axially splined in the worm, and an annular member rotatable in the chuck and having gear teeth meshing with the pinion so that movement of the annular member rotates the pinion to impart through the splined shaft a rotary movement to the worm to effect a supplemental radial adjustment to the movable jaw.

In testimony whereof I affix my signature.

JOSEF MEHREN.